United States Patent

[11] 3,536,241

| [72] | Inventor | David R. Knowlton<br>Ipswich, Massachusetts |
|---|---|---|
| [21] | Appl. No. | 789,479 |
| [22] | Filed | Jan. 7, 1969 |
| [45] | Patented | Oct. 27, 1970 |
| [73] | Assignee | United Carr Incorporated |

[54] FASTENER ATTACHING MACHINE WITH SWATCH FEED MECHANISM
6 Claims, 9 Drawing Figs.

| [52] | U.S. Cl. | 227/17<br>B25c 7/00 |
|---|---|---|
| [51] | Int. Cl. | |
| [50] | Field of Search | 227/15, 17,<br>18, 21, 41, 64, 76, 154 |

[56] References Cited
UNITED STATES PATENTS

| 1,683,652 | 9/1928 | Bray | 227/17 |
| 2,992,431 | 7/1961 | Jensen | 227/17 |
| 3,226,281 | 12/1965 | Carpinella | 227/17X |

*Primary Examiner*—Granville Y. Custer, Jr.
*Attorney*—James B. Tiffany, Jr.

ABSTRACT: A swatch feed mechanism for universal use with a fastener attaching machine comprising a plurality of drive cranks sequentially actuated by the fastener attaching machine prime mover to cut and feed swatch material to the jaws of attaching tools and simultaneously pivot a product carrier table out of axial alignment with the attaching tools so as to reduce puckering of the product upon impact.

Patented Oct. 27, 1970

INVENTOR
DAVID R. KNOWLTON

BY James B. Tiggery Jr.

ATTORNEY

INVENTOR
DAVID R. KNOWLTON
BY, James B. Tiffany Jr.
ATTORNEY

Patented Oct. 27, 1970

INVENTOR
DAVID R. KNOWLTON

BY, James B. Toggery J.

ATTORNEY

INVENTOR
DAVID R. KNOWLTON
BY, *James B. Tizzard Jr*
ATTORNEY

FASTENER ATTACHING MACHINE WITH SWATCH FEED MECHANISM

This invention relates generally to a fastener attaching machine and in particular to a machine having a swatch feed mechanism incorporated therein.

Various types of fastener attaching machines are in use in the industry today, some of which utilize mechanisms for feeding reinforcing tape simultaneously with the material to effect a tear resistant attachment. However, with the majority of these machines, difficulties have been experienced with the "-puckering" of the material as a result of the axial force exerted on the material and also on the extra thickness of the reinforcing tape. Furthermore, most of these machines are specifically designed for use with stapling type fasteners which could not be adapted for use with the male and female type snap fastener.

Therefore, it is an object of this invention to provide a fastener attaching machine which will feed and cut a swatch of material to the attaching jaws where it is simultaneously attached to a product by the male or female component of the fastener.

It is another object of this invention to provide, in combination with snap fastener attaching machine, a mechanism sequentially operated within the cycle of the fastener attaching process to cut and feed a swatch of material for attachment to the product without the puckering of the product material.

It is a further object of this invention to provide a mechanism for cutting and feeding a swatch of material to the jaws of a snap fastener attaching machine which is universally adaptable to existing machines.

Other objects of this invention will in part be obvious and will in part appear hereinafter.

Broadly stated, the basic feature of this invention is to provide a mechanism for feeding and cutting a swatch of material to the jaws of a snap fastener attaching machine in such a manner that the entire product feeding surface and the swatch feed is pivotable so as to minimize the axial force exerted in the product by the action of the fastener attaching process.

To the accomplishment of this and the foregoing related ends, the present invention then consists of the means, hereafter fully described and particularly pointed out in the claims, the drawings, and the following description, setting forth in detail certain means illustrating, however, but one of the various ways in which the principle of the invention may be employed.

Figure 9:
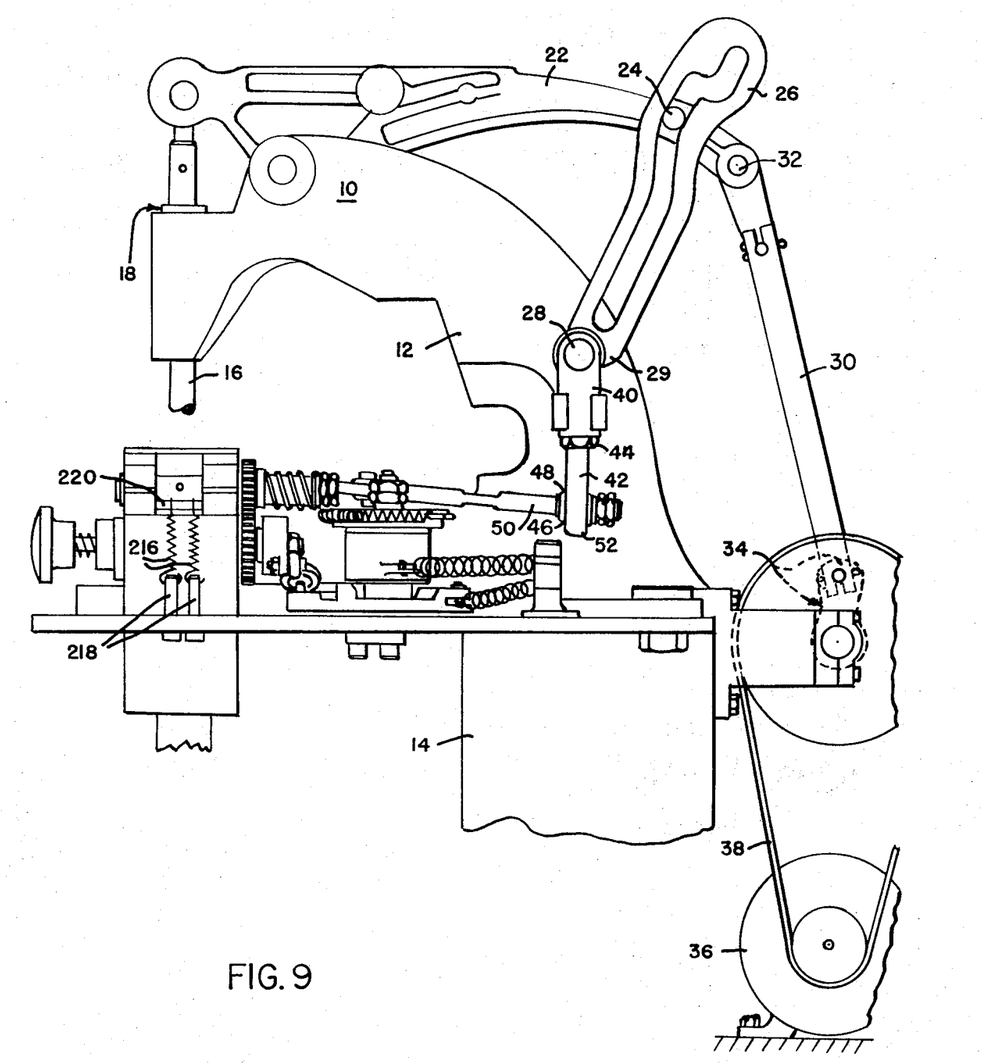
FIG. 9 is a view in side elevation, illustrating the linkage and drive between the fastener attaching machine and the swatch feed mechanism.

Reference is now to be had to the drawings wherein an illustrated embodiment of the fastener attaching machine with the swatch feed mechanism, a construction made in accordance with the present invention and designated by the reference numeral 10 as shown. Since the fastener attaching machine is of the general type common in use in the industry, the essential components necessary to illustrate the combination with the swatch feed mechanism are shown in FIG. 9 and generally comprise a yoke body 12 disposed in axial relationship to a base 14.

The body contains in a forward position a plunger 16 slidable within a bushing 18, with the plunger connected by means of a stud to an arcuate plunger lever 22. The plunger lever 22 has a drive stud 24 positioned thereon adapted for sliding engagement with a slotted side lever 26 which in turn has a drive arm body stud 28 positioned at the distal end 29. An operating crank rod 30 is secured to the arcuate plunger lever 22 through stud 32 and adapted for relative movement therewith. Arcuate movement of lever 22 through stud 24 positioned within the slot of the slotted side lever 26 imparts linear motion to drive arm 40. A motor 36 drives the crank rod 30 through a belt drive 38 and crank 34.

The elements of the present invention which operate in conjunction with the attaching machine 10 and as are set forth in FIGS. 1—8 will now be described. As illustrated in FIGS. 2 and 9, the drive arm body stud 28 has a drive arm 40 which is internally threaded to receive a lever rod 42 and which is locked into position by a lock nut 44. The drive arm 40 has suitable bearings 46 to allow for rotatable movement of the drive arm in response to movement of the side lever 26. A ball joint 48 is disposed at the end of a drive rod 50 to engage a ball joint socket 52 to form the connection between the lever rod 42 and the drive rod.

Figure 5:
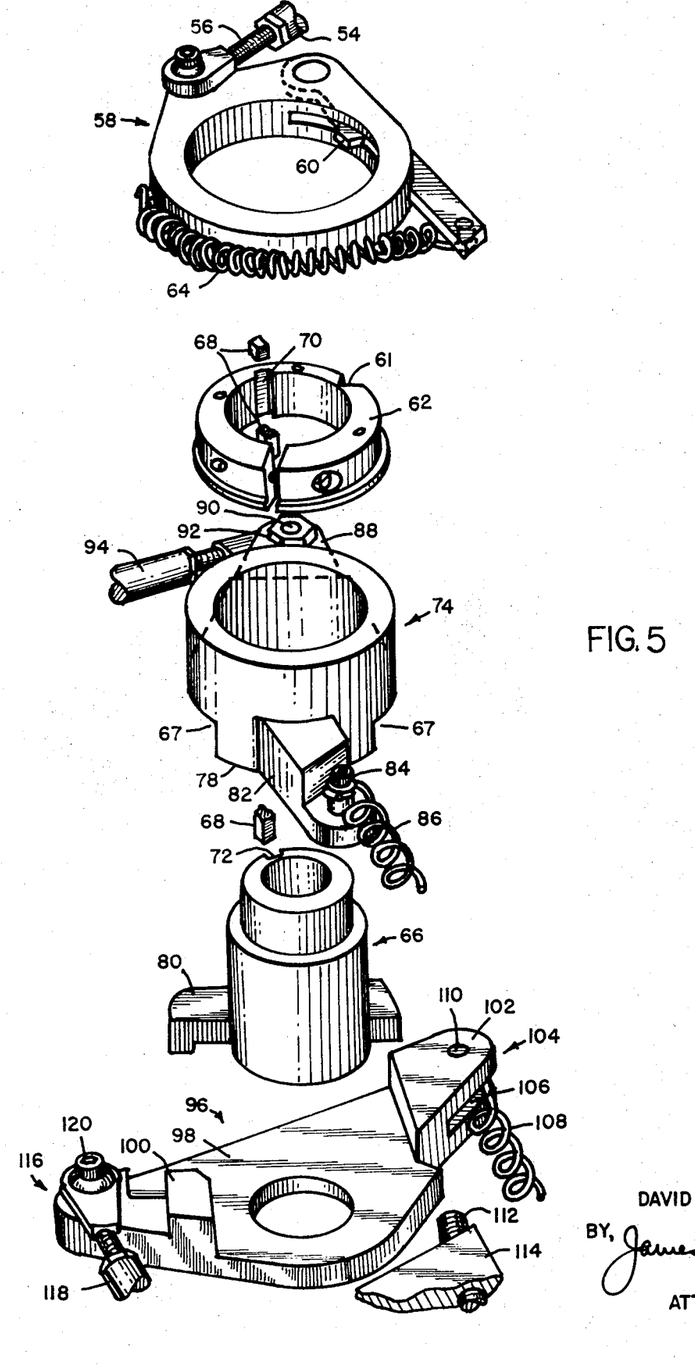
FIG. 5 is an exploded view of the knife, deflector and feed roll assemblies.

Referring to FIG. 5, the other end 54 of the drive rod 50 is shown engaged by a screw member 56 to a drive crank 58 having a latch 60 and which is adapted for engagement within the notch 61 of drive hub 62 and is spring loaded by means of spring 64 for a purpose to be set forth more fully hereinafter. FIG. 5 has been shown in the exploded view to more fully set forth the interrelationship between the several mechanisms which operate sequentially to perform several functions. The drive hub 62 is keyed to the subassembly crank 66 by means of a key 68 in keyways 70 and 72. A knife and deflector crank 74 is rotatably fitted on the subassembly crank 66 and has cut-out portions 67 extending from the lower edge 78 thereof to allow the flange member 80 of the subcrank assembly to lie recessed thereon. An abutment 82 extends angularly from the knife and deflector crank 74 so as to lie in the same plane as the flange member 80 and contains an anchor screw 84 for a spring 86 which biases the knife crank.

Extending from the peripheral surface of the knife crank 74 is a connecting flange 88 having pivotably attached thereto by means of a bolt 90 and nut 92, a knife actuator pull rod 94. A swatch feed crank 96 is then positioned under the subassembly crank 66 and consists of a triangularly shaped base plate 98 having a raised projection 100 substantially normal thereto and lying in the plane of the flange member 80 of the subassembly crank 66. A limiting flange 102 is disposed at one corner 104 of the tape feed crank having a slot 106 formed therein for the retention of a spring 108 by means of a pin 110. The limiting flange 102 lies in the plane of an adjustable stop pin 112 which is affixed to the frame 114. At the other corner 116 a swatch feed actuator rod 118 is pivotably secured by means of a screw member 120.

SWATCH FEED MECHANISM

Figure 1:
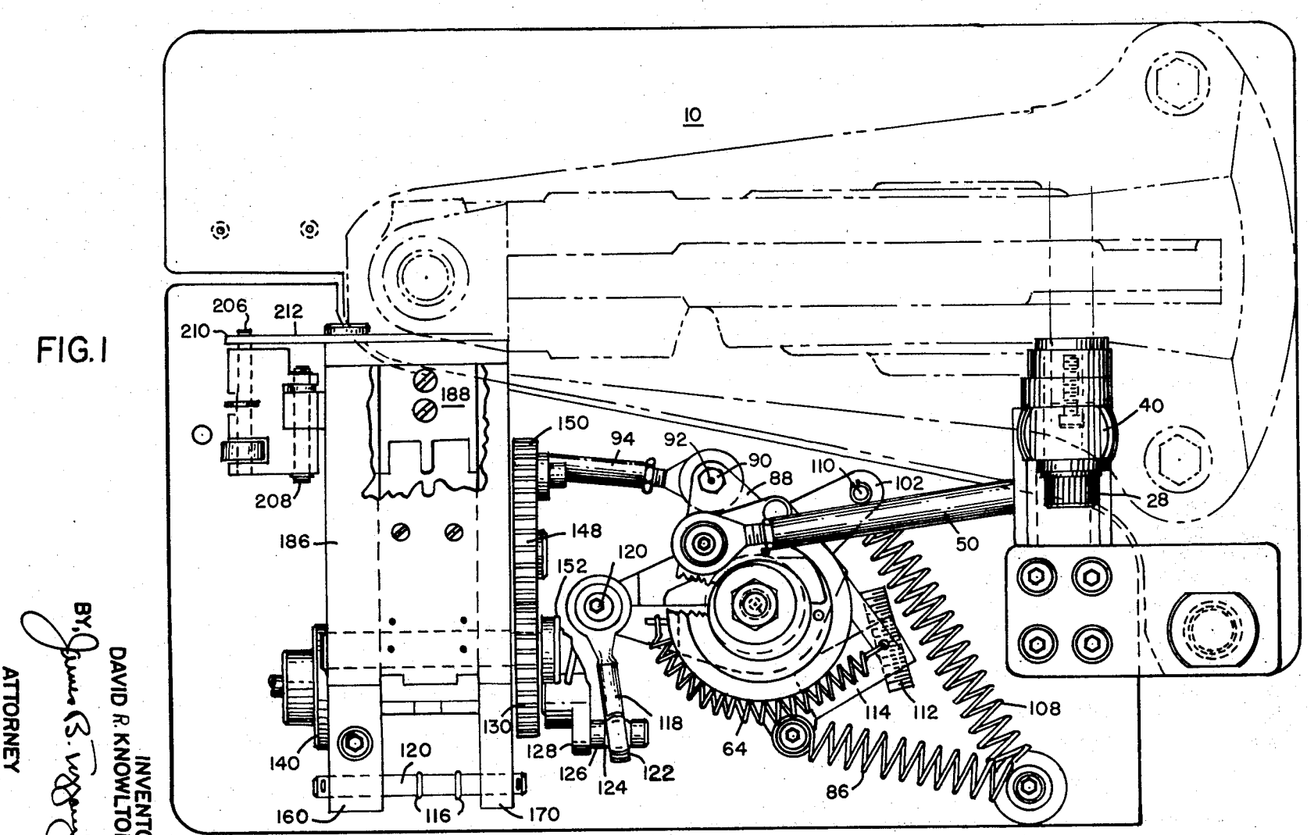
FIG. 1 is a top plan view of the swatch feed mechanism with a phantom view of the attaching machine.
Figure 2:
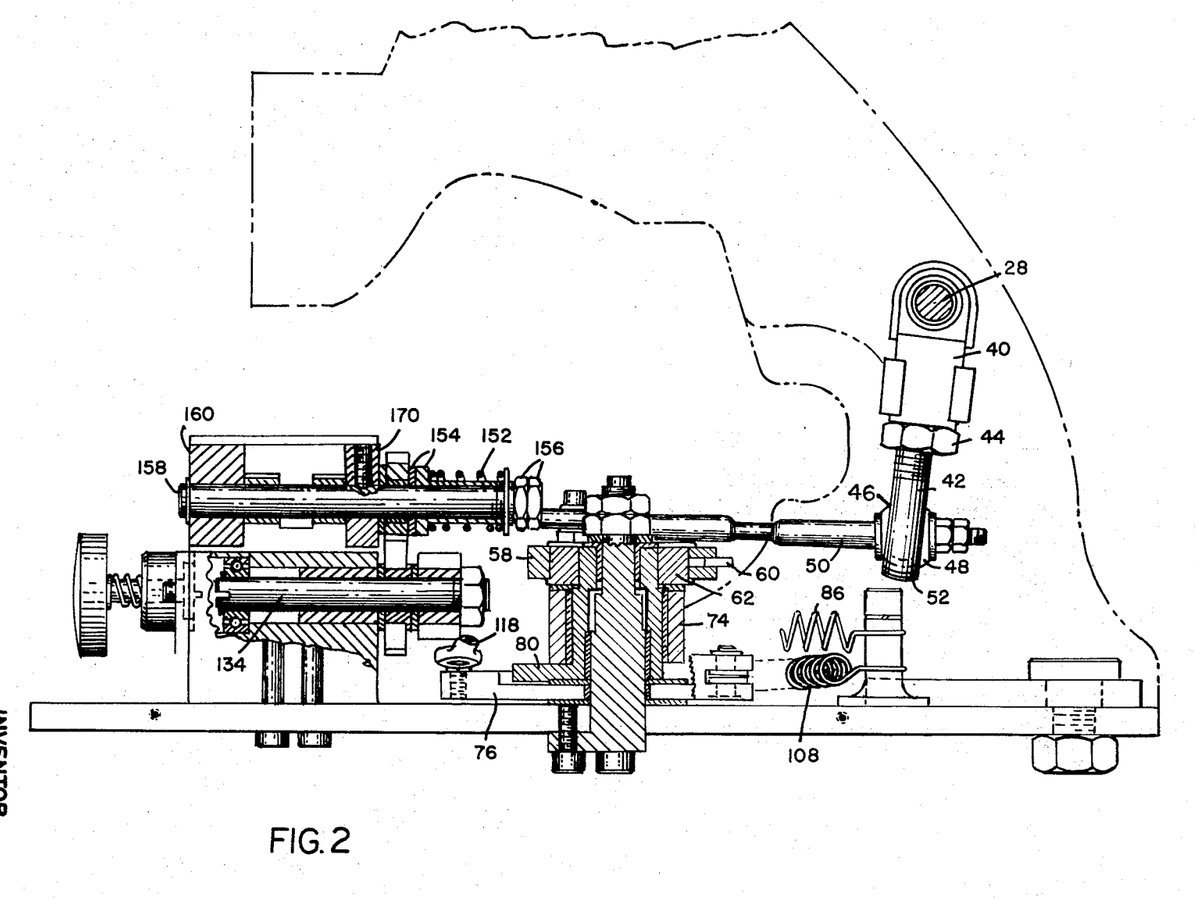
FIG. 2 is a view in side elevation partly in section of the swatch feed mechanism.
Figure 6:
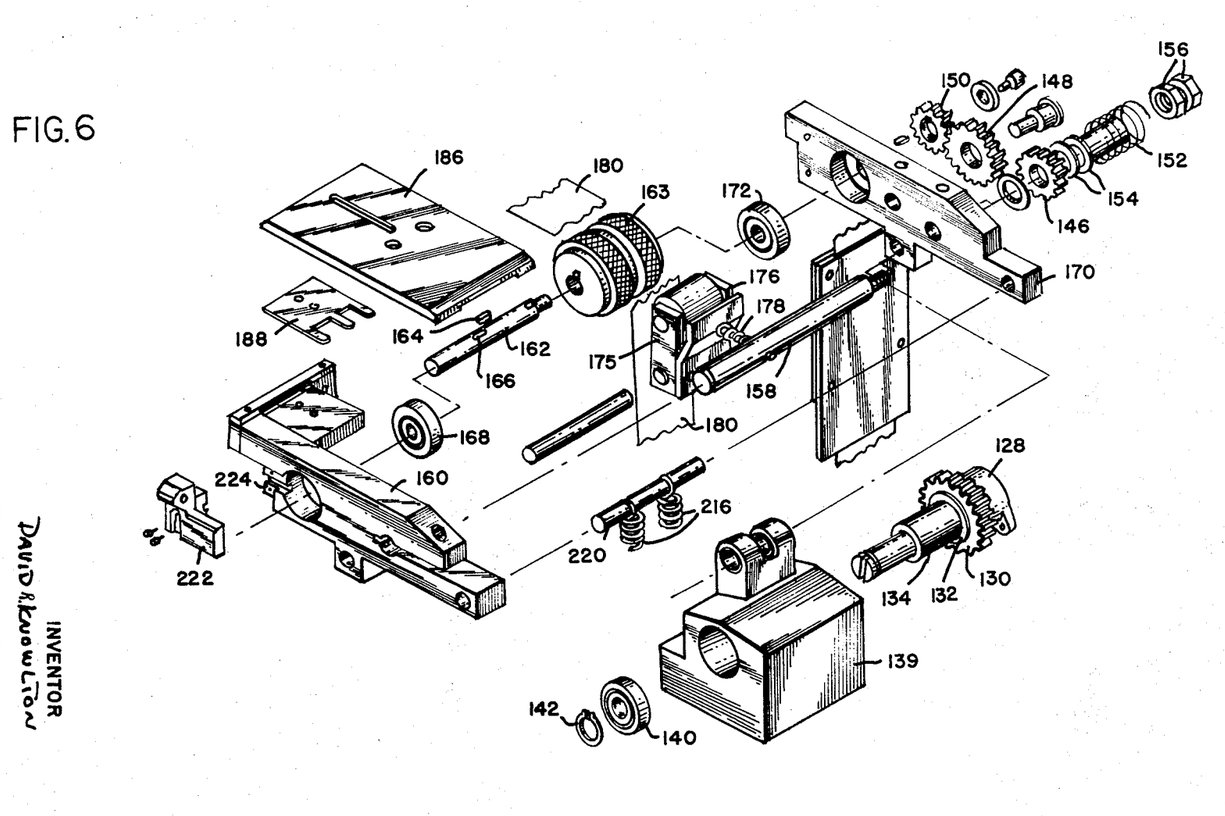
FIG. 6 is an exploded view in perspective of the drive mechanism.
Figure 7:
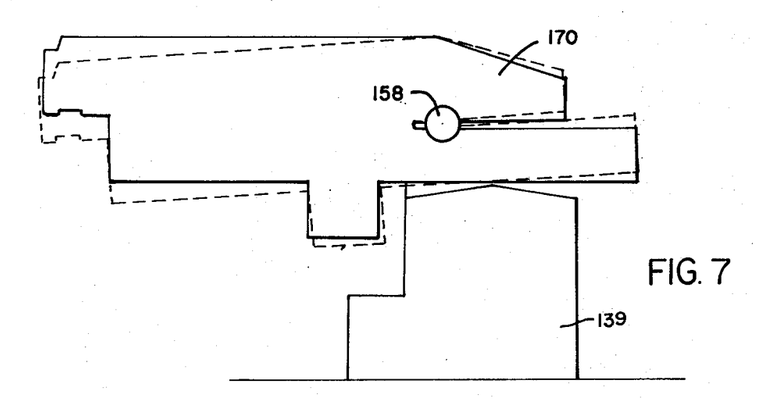
FIG. 7 is a schematic view of the table deflection.
Figure 8:
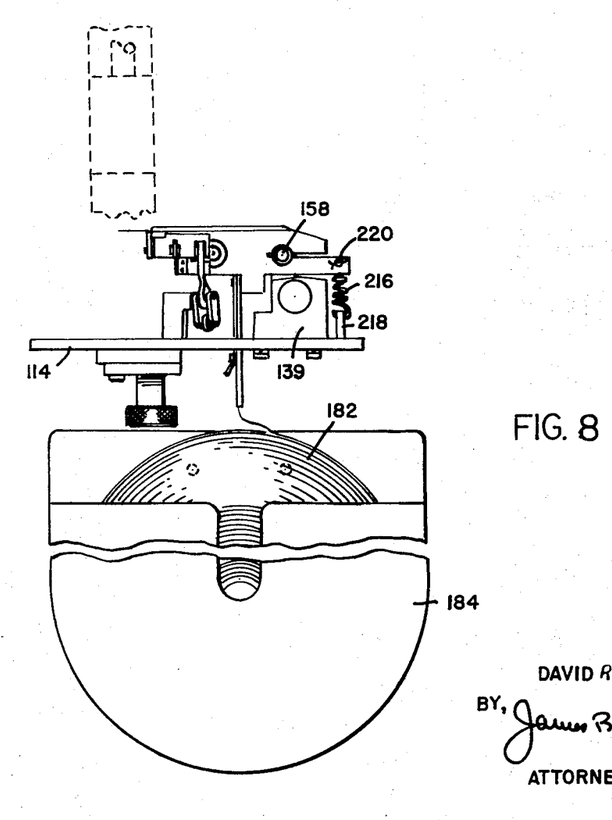
FIG. 8 is a view in front elevation illustrating the tape storage and line of feed.

Referring to FIG. 1, the swatch feed actuator rod 118 is shown having a ball joint socket 122 adapted for pivotable engagement with a ball joint 124 disposed on a gear drive rod 126, whereby linear movement of the actuator rod 118 will impart rotary motion to the gear drive rod 126. Referring to FIG. 1, and FIG. 6, the gear drive rod 126 as a crank 128 with a gear 130 mounted on a drive clutch 132 through a rod 134 having a back stop, ensuring rotary motion in one direction. The other end of the rod 134 is disposed in a bearing block 139 by means of a thrust bearing 140 and keeper ring 142. The gear 130 is adapted to mesh with a gear train having gear 146, an idle gear 148, and a swatch feed drive gear 150. The gear 146 has a drag brake comprising a spring 152 held in engagement with compression rings 154 by lock nuts 156 and prevents override of the gear 146. An idle shaft 158 extends from the gear 146 and is mounted in a support block 160.

There, gear 150 is secured to rod 162, which has a knurled roller 163 secured thereto by a key 164 in a keyway 166, with bearing 172, in the gear block 170 and a bearing 168 in the support block 160. Positioned intermediate the knurled roller 163 and the idle shaft 158 is a yoke bracket 175 carrying a plastic compression roller 176 which is spring biased in the direction of the knurled roller 163 by spring member 178 to maintain swatch material 180, which is maintained on a roll 182 within a storage deck 184 and axially disposed beneath the frame 114 (FIG. 8) in engagement with the knurled roller. An upper guide plate 186 and lower swatch carrier plate 188 are positioned in the direction of rotation of the knurled roller 163 which changes the direction of the swatch material approximately 90° from the vertical to the horizontal.

KNIFE ACTUATOR AND DEFLECTOR MECHANISM

Figure 3:
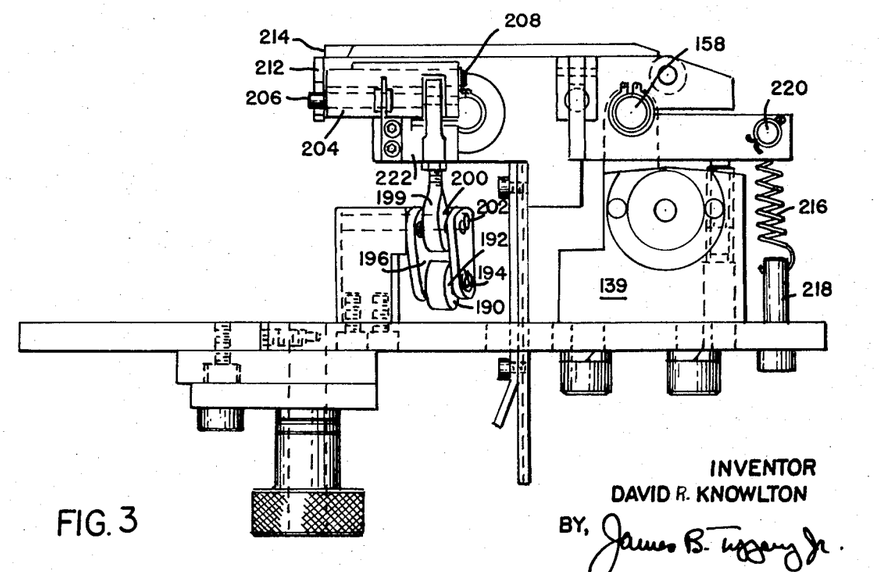
FIG. 3 is a view in front elevation of the feed roll assembly.
Figure 4:
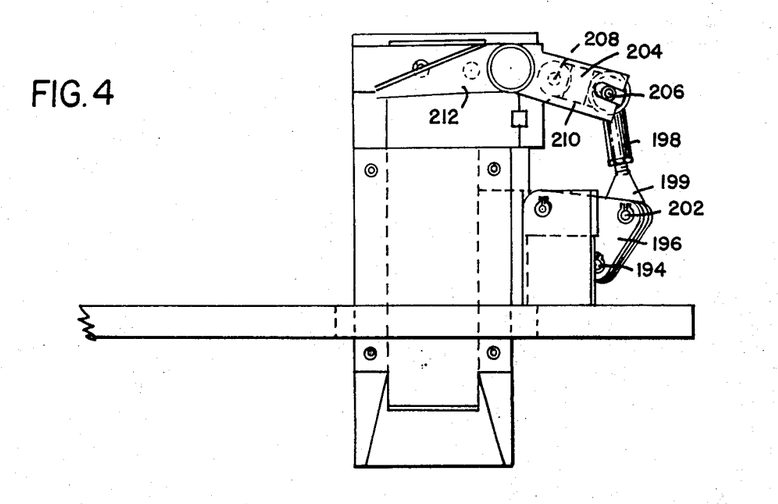
FIG. 4 is a view in side elevation of the knife subassembly.

Since the deflector mechanism operates as a continuation of the knife actuator mechanism, their components will be described in conjunction with each other. Referring to FIGS. 1, 3, and 4, the knife actuator pull rod 94 has a ball joint socket 190 positioned at one end which engages a ball joint 192 secured by a pin member 194 in knife crank 196. A knife pull-down rod 198 is also secured to the crank 196 by means of a ball joint socket 199 secured to a ball joint 200, maintained in the crank by a pin member 202, whereby the linear motion of the knife actuator rod 94 is converted into a downward movement on the knife pull-down rod 198. The knife pull-down rod 198 is in turn secured to an actuator crank 204 by means of a knuckle pin 206. The actuator crank 204 is rotatably secured to a pivot pin 208 at a point approximately intermediate the distal end 210 and an angularly extending moveable knife member 212. Referring to FIG. 3, it will be seen that when the angularly extending knife member is in its uppermost position, it will be in shearing engagement with a fixed knife member 214.

The table deflector mechanism is shown in FIGS. 4, 5, 6, 7, and 9, where the table is spring biased upwardly by means of springs 216 having one end retained in bolt members 218 with the upper end secured to a transversely ending pin member 220. The idle shaft 158 extends through the support block 160 so as to allow the block 160 to freely pivot thereon. A stop member 222 extends outwardly from one face 224 of the support block 160 adapted for abutting engagement with actuator crank 204 to prevent further upward movement of the moveable knife member 212.

OPERATION OF THE DEVICE

The swatch feed, knife actuator and deflector mechanism act in sequential operation in combination with the fastener attaching machine in the following manner. When the machine is actuated through suitable controls (not shown) the motor 36 transmits rotary motion through the belt drive 38 and crank 34 drawing the crank rod 30 rearwardly, imparting an arcuate motion to plunger lever 22 through stud 32. Continual motion of plunger lever 22 moves the slotted side lever 26 and causes the drive arm 40 to move rearwardly in a linear direction. The drive crank 58 converts the linear action of the drive rod 50 into a rotary motion allowing the latch 60 to engage the notch 61 in the drive hub 62. In the event there is a jamming on the fastener attaching operation, the overload release latch 60 which is spring loaded by spring 64 to a predetermined tension allows the drive hub 62 to become disengaged and become automatically reset for a subsequent operation. In normal operation, the drive hub 62 rotates the subassembly crank 66 moving the stop 80 on the crank away from stop 100 of the base plate 98 of the swatch feed crank 96. The action of the spring 108 causes a clockwise rotation on the plate 98 pulling the swatch feed actuator rod 118. The crank 120 converts the linear motion of the rod 118 into rotary motion and rotates gears 130, 146, 148, and swatch feed drive gear 150. The motion of a gear 150 through rod 162 rotates the knurled rollers 163 causing the swatch material 180, which is held in frictional engagement by the plastic compression roller 196 against the knurled rollers 163, to be fed vertically upward wherein the upper guide plate 186 and the carrier plate 188 direct the swatch material 180 to the knife member 212 and the attaching station. The subcrank assembly 66 continues to rotate allowing the swatch feed crank 96 to rotate until limiting flange 102 hits the stop pin 112. However, the subcrank assembly 66 continues to rotate clockwise causing the other end of the flange 80 to contact the wall of the cut-out 76, thereby imparting a clockwise rotation to the knife and deflector crank 74 against the biasing action of the spring 86. Continued rotation of the knife and deflector crank 74 imparts a linear motion to the knife actuator pull rod 94 drawing the pull rod 94 rearwardly.

Since the knife actuator pull rod 94 is pivotably attached to the knife pull rod 198, the knife is pulled through an arc causing the knife pull-down rod 198 to be drawn downwardly thereby pivoting the actuator crank 204 on the pivot pin 208 forcing the moveable knife member 212 upward into shearing engagement with the fixed knife member 214 and cutting a predetermined section of swatch material which is fed to the attaching station. The knife and deflector crank 74 continues to rotate however, until the knife actuator crank 204 comes into abutting relationship with the stop member 222 on the face 224 of the support block 160 preventing further movement of the knife actuator crank but only relative to the support block 160. Since the support block is an integral part of the entire table assembly 226 and is pivotally mounted on the idle shaft 158, continued downward movement of the knife actuator crank 204 bearing on the stop member 222 overcomes the biasing action of the spring member 216 causing the table assembly 226 to deflect downward as shown in the dotted pictorial of FIG. 7. In the timed sequence of the operation, it is at the lowest point of deflection of the table assembly that the fastener is attached through a product and also simultaneously through the precut swatch material.

After completing the cycle, the swatch feed actuator rod 118 is pushed into a direction toward the forward end of the machine through imparting a counterclockwise rotation to the subassembly crank 66 forcing the flange 80 to bear against projection 100 overcoming the action of spring 108, forcing the plate 98 and subassembly crank 66 into the original position. Similarly the release of flange member 80 against the wall of the cut-out portion 76 permits the spring 86 to rotate the knife and deflector crank into its starting sequence. The drive hub 62 being keyed into the subassembly crank 66 rotates with the drive crank 58 the prime mover for the entire reversing operation being the movement of the drive rod 50.

While there have been described herein what are at present considered to be preferred embodiments of the invention, it will be obvious to those skilled in the art, that modifications and changes may be made without departing from the essence of the invention. It is therefore to be understood that exemplary embodiments are illustrative and not restrictive of the invention, the scope of which is defined in the appended claims and that all modifications that come within the meaning and range of equivalency of the claims are intended to be included herein.

I claim:

1. In a fastener attaching machine having a fastener component attaching station, the combination therewith of a swatch feed mechanism comprising:
   a. a work table pivotable on an axis and spring biased into a position normal to the attaching station;
   b. means for angularly delivering swatch material from a station below the work table to the surface of the table;
   c. knife actuator means having a moveable knife connected thereto for severing a predetermined length of swatch material; and
   d. table deflection means operative in conjunction with said knife to pivot said table downwardly whereby swatch material may be fed, cut and attached to a work product simultaneously with the fastener component during a period of table deflection.

2. The combination as set forth in claim 1, where said means for angularly delivering swatch material comprise:
   a. a feed crank operative sequentially in response to movement of the fastener attaching machine;
   b. said crank in direct engagement with a gear train driving a knurled roller;
   c. swatch material held in frictional engagement with said knurled roller by spring biased pressure means; and
   d. guide plate means converting axial flow of said swatch material to linear direction.

3. The combination as set forth in claim 1 where said knife actuator means comprise:
   a. knife drive crank operative sequentially in response to movement of the fastener attaching machine;
   b. said crank in direct engagement with a bell crank having knife means disposed thereon; and
   c. said knife means adapted for shearing engagement with fixed knife means disposed on said work table.

4. The combination as set forth in claim 1, where said table deflection means comprise:
   a. stop means disposed on said table adapted for abutting relationship with said knife actuator means; and
   b. said table pivotable on its axis in response to continued movement of said knife actuator means.

5. The combination with a fastener attaching machine for attaching fastener units to a work product, of a swatch feed mechanism comprising:
   a. a work table pivotable on an axis;
   b. a plurality of drive cranks superposed on a main crank assembly and adapted for sequential operation;
   c. said main crank assembly rotatable in response to operation of the fastener attaching machine through drive rod means;
   d. the first of said drive cranks in engagement with feed means for delivering swatch material to the work table;
   e. the second of said drive cranks in direct connection with knife actuator and table deflection means;
   f. said knife actuator means pivotable about an axis parallel to the plane of the work table, and having a moveable knife at one distal end thereof;
   g. stop means on said work table adapted for abutting relationship with said knife actuator means at a predetermined arc of its axis; and
   h. said table deflection means operative in response to continued movement of said knife actuator means after contact with said stop means, to deflect said work table out of a plane normal to said fastener attaching machine, whereby fastener units are attached to a work product and swatch material simultaneously during a period of deflection of the work table.

6. A swatch feed mechanism adapted for use with a fastener attaching machine comprising:
   a. a pivotable work carrier table;
   b. a plurality of drive cranks assembly superposed on a main crank assembly;
   c. said main crank assembly having drive cams for abutting relationship with said drive crank and sequential rotatable movement therewith and operative in response to movement of the fastener attaching machine;
   d. the first of said drive cranks in engagement with a gear train driving a knurled roller;
   e. swatch material held in frictional engagement with said knurled roller by spring biased pressure means, and moveable therewith;
   f. the second of said drive cranks in direct connection with a bell crank having knife actuator means and table deflection means depending therefrom; and
   g. said table deflection means operative as a continuation of movement of said knife actuator means, whereby fastener components may be attached to a work product and swatch material simultaneously during the period of table deflection.